Nov. 22, 1960 R. I. MOORE 2,960,717
CASTER SWIVEL CONTROL DEVICE
Filed Sept. 3, 1957
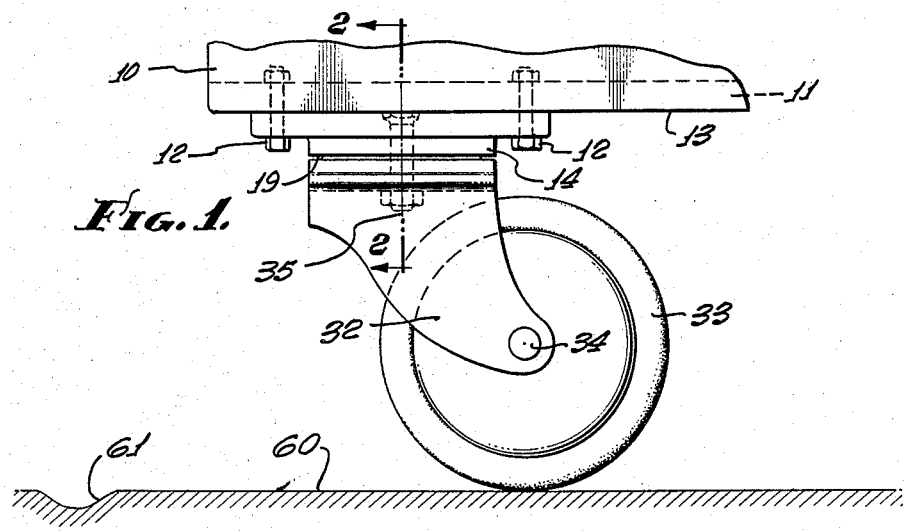
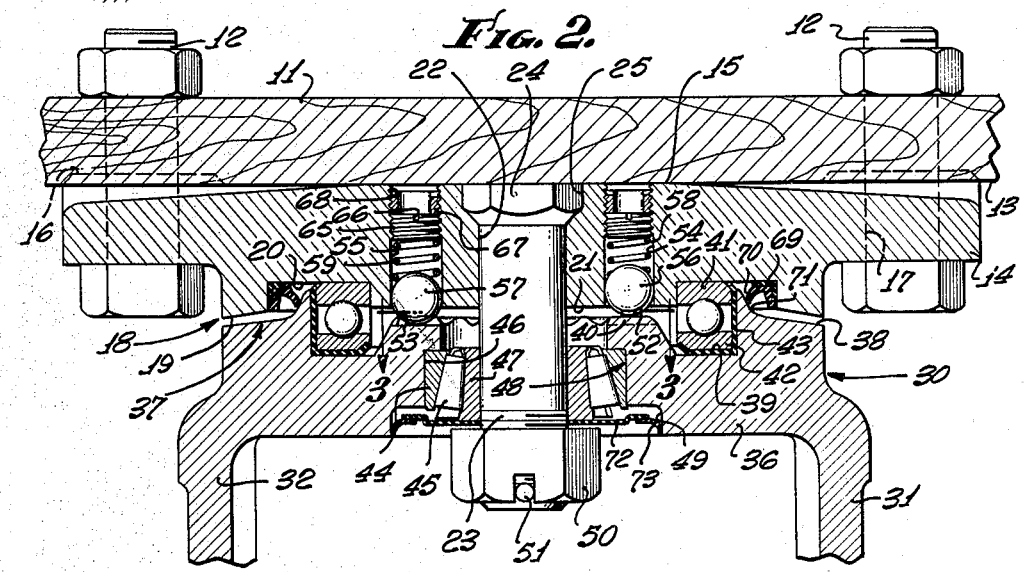
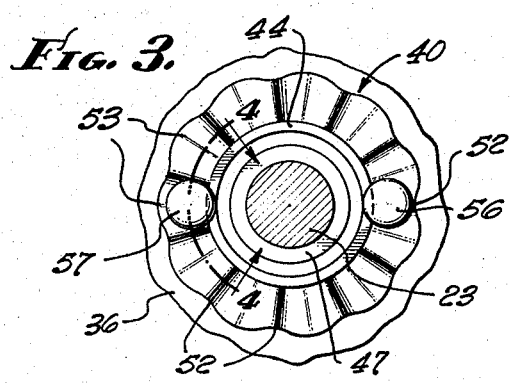
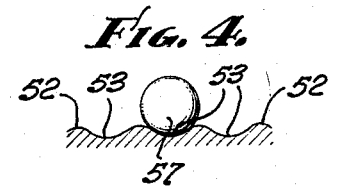
INVENTOR.
ROBERT I. MOORE
BY
ATTORNEYS.

United States Patent Office 2,960,717
Patented Nov. 22, 1960

2,960,717

CASTER SWIVEL CONTROL DEVICE

Robert I. Moore, North Hollywood, Calif., assignor to Aerol Co., Inc., Los Angeles, Calif., a corporation of California Filed Sept. 3, 1957, Ser. No. 681,544

6 Claims. (Cl. 16—21)

The invention relates to caster wheels and has special reference to a swivel type caster wheel and usually a wheel of that description of somewhat heavy construction sufficient to support relatively heavy loads.

The accelerated pace of manufacturing and assembly processes as well as a progressively increasing extension in warehousing facilities during the past decade has given the production of caster wheels and caster wheel mounted vehicles a considerable impetus. It has been found materially advantageous to move loads about on caster mounted dollies and trucks which can be spotted at will in any area within a large space rather than to depend upon fixed lines of travel defined by tracks which heretofore has often been used where heavy loads have been encountered. To be able to move loads at will over a large open space admits of increased versatility in the employment of factory and warehouse areas.

Although swivel caster wheels have had wide use for a great many decades, more stringent requirements of present day practice have rendered many of the old wheel structures obsolete. Among such more stringent requirements are those which necessitate caster mounted dollies and trucks to be steered and guided in a fixed direction over areas which may on occasions be rough and bumpy or even have pits and holes in them of sufficient depth and area to deflect the wheel and its burden too far away from a directed line of travel.

Other circumstances which need to be met are those wherein the rolling equipment must be kept strictly sanitary by steam cleaning and washing with detergents and other cleaning substances of such character that they would cause rapid deterioration in the moving parts of the swivel caster structure unless properly protected.

It is therefore among the objects of the invention to provide a new and improved swivel control for a caster mount or caster wheel structure of such nature that the direction of travel of the wheel can be kept steady even though the wheel might encounter sundry deflecting surfaces, projections and rutty hollows during the usual course of operation.

Another object of the invention is to provide a new and improved swivel caster control which though simply constructed is capable of being set at virtually any desired position of rotation of the wheel mount with respect to the vehicle which it is designed to carry.

Still another object of the invention is to provide a new and improved swivel control for a caster wheel mount or fork wherein the means provided for releasably retaining the caster in a chosen direction can be set at any one of several different degrees of tension to accommodate the same caster wheel structure to a wide variety of different load supporting conditions, Still another object of the invention is to provide a new and improved swivel control for a caster wheel mount which is especially rugged and simple in its design thereby to minimize servicing problems as well as to make possible the production of controlled swivel wheels and to keep the cost thereof well within reasonable bounds.

Still further among the objects of the invention is to provide a new and improved swivel mount for caster wheels which incorporates roller bearings or ball bearings or both and wherein the bearings and virtually all moving parts are contained within space sealed with respect to the exterior by rotating seals in such a manner that steam and liquid or other detergents used for cleaning the apparatus cannot penetrate to the bearing parts and other moving parts and which seal at the same time serves as an effective seal to contain a suitable lubricant.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side view of a typical swivel caster wheel incorporating the invention.

Figure 2 is a longitudinal sectional view of the interior construction taken on the line 2—2 of Figure 1 with portions removed in the interest of clarity.

Figure 3 is a fragmentary cross-sectional view taken on the line 3—3 of Figure 2.

Figure 4 is a fragmentary longitudinal sectional view taken on the line 4—4 of Figure 3.

In the embodiment of the invention chosen for the purpose of illustration there is shown a fragment 10 of a dolly or truck which, for example, consists of one corner of such truck on which a caster wheel would normally be mounted. A bed portion 11 of the truck serves as a structure through which bolts 12 can extend for the purpose of bolting the swivel caster wheel structure in place. Ordinarily a lower surface 13 of the bed portion is flat and it becomes desirable to so construct the swivel caster wheel structure that it can be applied properly to such a flat surface without there being any necessity for alteration of the surface.

The swivel caster wheel structure includes a body plate 14 having an upper flat surface 15 adapted to contact the surface 13 on the lower side of the bed portion. Projections 16 may be employed for penetrating slightly the surface of the bed portion in order to assist in anchoring the body plate against rotation. Bolt holes 17 in the body plate are provided for the bolts 12 previously identified whereby the bolts pass through the body plate and in engagement therewith for anchoring the body plate securely to the body of the truck.

On the bed plate is a lower rotating area indicated generally by the reference character 18 which is somewhat composite in its construction in that it includes an outer annular area 19, an annular recess 20, and an inner annular area 21. At the mid-point or center of the rotating area 18 with respect to the other designated areas is a swivel aperture 22 in which is located a swivel pin 23. A head 24 of the swivel pin is received in a countersunk portion 25 of the body plate 14.

The lower portion of the swivel assembly comprises a fork member 30 consisting of a pair of spaced wheel supporting legs 31, 32 between which is mounted a wheel 33 on an axle 34. It will be noted that the axle 34 is offset with respect to the line which comprises an axis of rotation 35 of the swivel mounting.

The fork member also includes a base portion 36 having an upper rotating area indicated generally by the reference character 37. This rotating area 37 is coextensive with and generally horizontal and parallel to the lower rotating area 18 of the body plate 14.

More particularly the rotating area 37 which is somewhat composite in its structure has an outer annular area 38, an annular recess 39 concentric therewith, and an annular track 40 inside of the annular recess and likewise concentric.

An upper race 41 of a roller bearing is contained within an inner portion of the annular recess 20 and cooperates with a lower race 42 which is held by a retainer 43 within the annular recess 39.

An outer race 44 for roller bearings 45 is contained within a bearing recess 46, the outer race being adapted to cooperate with an inner race 47 which surrounds and engages the swivel pin 23. The last identified roller bearings serve in addition as thrust bearings. To accommodate the last identified bearings the base plate 36 is provided with a bearing cavity 48 which at its lower end joins an enlargement 49. A splined nut 50 threaded over the lower end of the swivel pin 23 holds the parts together and the nut is prevented from unwanted rotation by a cotter pin 51.

In order to control the swivel motion of the fork member 30 with respect to the body plate, the track 40 is so constructed as to provide a series of circumferentially spaced forms 52 alternating with a series of depressions 53.

In the body plate 14 is a pair of ball recesses 54, 55 diametrically opposite each other in the chosen embodiment and in alignment with the center line of the track 40. Balls 56, 57 move in the respective ball recess and are normally urged outwardly by compression springs 58, 59.

It will be understood from the description of the device that as the body of the truck is moved along a selected line of travel, the wheels 33 will take positions following the lead of the axis of rotation 35. As long as a floor surface 60 is smooth and even there will be no deviation of the wheel from the selected line of travel. Under circumstances, however, where a rut or depression such, for example, as the depression 61 might be encountered, there would be likelihood of throwing the direction of travel of the wheel 33 off to some degree. This is prevented by the structure shown by reason of the fact that one of the balls 56 or 57, as the case may be, will be spring-pressed into the nearest depression 53 and thus resist tendency of the fork member to be displaced. By locating the balls 56, 57 diametrically oppose each other and by providing a recess 53 diametrically opposite a horn 52, there will be opportunity for one or another of the balls to engage a recess for every angular difference of one-half of the angular difference between adjacent recesses. For practical purposes about eleven recesses and a corresponding number of horns are found sufficient.

Should it be desirable to vary the spring pressure upon the balls, there may be provided a screw plug 65 in which is a screw driver slot 66 which can be moved downwardly or upwardly relative to the spring 59, for example, thereby to vary the action of the spring on the respective ball. After the spring has been properly adjusted, a lock nut sleeve 67 may be tightened in place, thereby fixing the position of adjustment of the plug 65. The lock nut thus mounted remains in a position below the upper surface 15 of the body plate and hence removes from obstructing engagement with the lower surface 13 of the bed portion 11. On those occasions where an entirely different spring characteristic might be needed, the springs may be removed and replaced with other different springs.

In order to effectively seal the bearing cavity 48, an annular seal ring 69 is mounted against the outer wall of the annular recess 20, the annular seal 69 has a flexible flange 70 adapted to contact a curved portion 71 of the fork member so that as the fork member rotates there is a rotating seal between the curved portion and the flange. Hence, by reason of the direction of flexure of the flange, ingress of steam and liquid and other detergents to the bearing cavity is prevented.

Immediately surrounding the swivel pin 23 is a seal plate 72 bound in position by the nut 50 so as to remain in fixed position. An annular seal 73 is fixed within the enlargement 49 and engages an outermost portion of the seal plate 72. Hence, when the fork member rotates, the seal 73 will rotate at a location bearing against the seal plate and thus seal the bearing cavity against ingress of liquids and fluids on the exterior. It will be noted that by reason of locating the seals as shown, all of the moving parts and interior parts of the mechanism are effectively protected against outside deteriorating influences and at the same time there is provided a sealed cavity for the retention of adequate lubricants. Such lubricants are also depended upon where need be as a means of protecting the working parts and particularly ferrous parts against undue deterioration.

There has accordingly been provided herein a very simple, rugged, and effective control for a swivel caster wheel which is particularly versatile in that it can fix the wheel in any desired position for all practical purposes and so constructed that the parts are safe against deterioration under all variety of conditions.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

I claim:

1. In a swivel caster wheel comprising a body plate, a wheel fork member having legs extending obliquely outwardly and downwardly, a vertical swivel pin pivotally connecting said body plate and said fork member, and a wheel rotatably mounted between said legs at lower ends thereof, the combination of control means for the swivel movement comprising a lower rotating section on said body plate, an upper rotating section on said fork member, an annular area concentric with respect to the swivel pin and comprising a plurality of circumferentially spaced alternating rounded elevations and depressions having relative positions providing at all locations a depression diametrically opposite an elevation, and means forming a pair of diametrically aligned ball recesses in the body plate in alignment with portions of said area, a spring at the bottom of each recess and a ball in each recess bearing against the spring whereby one of said balls is urged into a depression at one of said plurality of positions of rotation of said fork member when the other ball is urged against an elevation.

2. In a swivel caster wheel comprising a body plate, a wheel fork member having legs extending obliquely outwardly and downwardly, a vertical swivel pin pivotally connecting said body plate and said fork member, and a wheel rotatably mounted between said legs at lower ends thereof, the combination of control means for the swivel movement about said pin comprising a lower rotating section on said body plate, an upper rotating section on said fork member, an annular bearing having an upper race on said upper rotating section and a cooperating lower race on said lower rotating section, an annular area concentric with respect to the swivel pin and comprising a plurality of circumferentially spaced rounded interconnected alternating elevations and depressions having relative positions providing at all locations a depression diametrically opposite an elevation, and means forming a pair of diametrically located ball recesses in the body plate in alignment with portions of said area, a spring at the bottom of each recess and a ball in each recess bearing against the spring whereby one of said balls is urged into a depression at each of said plurali of locations upon rotation of said fork member when the other of said balls is urged against an elevation.

3. In a swivel caster wheel comprising a body plate, a wheel fork member having legs extending obliquely outwardly and downwardly, a vertical swivel pin pivotally connecting said body plate and said fork member, and a wheel rotatably mounted between said legs at lower ends thereof, the combination of control means for the swivel movement about said pin comprising a lower rotating section on said body plate, an upper rotating section on said fork member, an annular bearing having an upper race on said upper rotating section and a cooperating lower race on said lower rotating section, an annular area concentric with respect to the swivel pin and comprising a plurality of circumferentially spaced interconnecting alternating elevations and depressions having relative positions providing at all locations a depression diametrically opposite an elevation, and means forming a pair of diametrically located ball recesses in the body plate in alignment with portions of said area, a spring at the bottom of each recess and a ball in each recess bearing against the spring whereby one of said balls is urged into a depression at each of said plurality of locations upon rotation of said fork member when the other of said balls is located opposite an elevation, and a tension adjusting member in engagement with each spring having an adjusting element accessible at the upper face of said body plate.

4. A sealed swivel caster comprising a body plate having a lower rotating section, means forming a ball recess extending through said lower rotating section, a spring pressed ball in said recess and a plug closing the recess at the end above said ball, a wheel fork member having wheel mounting forks and an upper rotating section on said fork member in swivelling relationship on a vertical axis with said lower rotating section, cooperating bearing elements on said respective rotating sections and a rotating annular seal having its center disposed on said axis, the seal encircling said bearing elements and said spring pressed ball and engaging respectively said upper and lower rotating sections, an annular area comprising a series of depressions in alignment with and in a position of potential engagement with said spring pressed ball, a swivel pin extending through said body plate and said fork member and swivelly securing said fork member to said plate member, a second bearing between said fork member and said swivel pin, and a rotating sealing means respectively on said fork member and said swivel pin on the lower side of said second bearing at a location encircling said second bearing, whereby said bearing elements and bearing elements and said spring pressed ball are sealed against infiltration of external fluids.

5. A sealed swivel caster comprising a body plate having a lower rotating section, means forming an annular recess in said section, means forming a ball recess in said section, a spring pressed ball in said ball recess within the circumference of said annular recess and a plug closing said recess above the ball, a wheel fork member having wheel mounting forks and an upper rotating section on said fork member in swivelling relationship with said lower rotating section, means forming an annular recess in said lower rotating section, cooperating bearing elements on said respective rotating sections and a rotating annular seal engaging respectively said upper rotating section and a wall of the annular recess in said lower rotating section, an annular area comprising a series of depressions in circumferential alignment with and in a depression in circumferential alignment with and in a position of potential automatic engagement with said spring pressed ball, said annular seal being larger in diameter than and encircling said bearing elements and said annular area of depressions, a swivel pin extending through said body plate and said fork member and swivelly securing said fork member to said plate member, a bearing between said fork member and said swivel pin, and a pair of mutually rotating seal elements respectively on said fork member and said swivel pin on the lower side of said roller bearing and in rotatable sealing engagement with each other, whereby said bearings and said spring pressed ball are sealed against infiltration of external fluids.

6. A sealed swivel caster comprising a body plate having a lower rotating section, means forming an annular recess in said section, means forming a pair of diametrically positioned ball recesses extending through said rotating area within the circumference of said annular recess, a spring pressed ball in each ball recess, and a plug closing each said recess above the ball, a wheel fork member having wheel mounting forks and an upper rotating section on said fork member in swivelling relationship with said lower rotating section, means forming an annular recess in said lower rotating section, cooperating bearing elements in said respective annular recesses and a rotating annular seal engaging respectively said upper rotating area and a wall of the annular recess in said lower rotating area, an annular area of alternating interconnected elevations and depressions in circumferential alignment with and in a position of potential automatic engagement with said spring pressed balls, said annular seal being larger in diameter than and encircling said bearing elements and said annular area of elevations and depressions, a swivel pin extending through said body plate and said fork member and swivelly securing said fork member to said body plate member, a roller bearing between said fork member and said swivel pin, and a pair of inner and outer mutually rotating seal elements respectively on said fork member and said swivel pin on the lower side of said roller bearing and in rotatable sealing engagement with each other, whereby said bearings and said spring pressed balls are sealed against infiltration of external fluids.

References Cited in the file of this patent
UNITED STATES PATENTS

| 1,515,091 | Brower et al. | Nov. 11, 1924 |
| 1,822,998 | Noelting | Sept. 15, 1931 |
| 1,971,613 | Kindelberger | Aug. 28, 1934 |
| 2,503,076 | Smith | Apr. 4, 1950 |
| 2,505,852 | Budnick | May 2, 1950 |
| 2,553,013 | Sciuto | May 15, 1951 |
| 2,635,281 | Feldberg | Apr. 21, 1953 |
| 2,707,794 | Kramcsak | May 10, 1955 |
| 2,787,804 | Noelting et al. | Apr. 9, 1957 |